United States Patent [19]
Antkowiak

[11] 3,718,702
[45] Feb. 27, 1973

[54] PROCESS FOR PRODUCING DILITHIO HYDROCARBONS

[75] Inventor: Thomas A. Antkowiak, Cuyahoga Falls, Ohio

[73] Assignee: The Firestone Tire & Rubber Company, Akron, Ohio

[22] Filed: April 14, 1971

[21] Appl. No.: 134,059

[52] U.S. Cl. ..........260/665 R, 252/431 L, 260/83.7, 260/94.2 M
[51] Int. Cl. ...............................................C07f 1/02
[58] Field of Search......................260/665 R, 94.2 M

[56] References Cited

UNITED STATES PATENTS

| | | | |
|---|---|---|---|
| 2,734,091 | 2/1956 | Londergan | 260/665 R |
| 3,085,120 | 4/1963 | Seyferth et al. | 260/665 R |

OTHER PUBLICATIONS

Mark. Encyclopedia of Polymer Science and Technology Interscience Publishers New York, N.Y., 1964, Vol. 1, p. 644

Strohmeier et al. Z. Fu Elektrochemie 66, (1962) p. 823-7.

*Primary Examiner*—Patrick P. Garvin
*Assistant Examiner*—A. P. Demmers
*Attorney*—S. M. Clark and Gordon B. Seward

[57] ABSTRACT

Dilithio hydrocarbons are produced by heating allyllithium or a hydrocarbon-substituted allyllithium for 20–200 hours at 50°–150° C. Substituted allyllithiums can have alkyl groups or aryl groups, but must have replaceable allylic hydrogen. The products are useful as iniators for polymerization.

5 Claims, No Drawings

PROCESS FOR PRODUCING DILITHIO HYDROCARBONS

BACKGROUND OF THE INVENTION

This invention relates to a method for producing lithiated hydrocarbons. More specifically, it relates to a method for producing various dilithio hydrocarbon compounds which are useful as initiators for polymerization of a variety of monomeric materials.

It is known that compounds such as trans-stilbene can be lithiated by reacting them with a lower-alkyl monolithium compound in a polar solvent medium. It is difficult, however, to remove the last traces of the polar solvent, and its presence affects the microstructure of diene polymers initiated with the lithiated products.

Other investigators have di-, tri-, and tetra-lithiated acetylenes by reacting acetylenes, in hydrocarbon solvent, with an alkyl mono-lithium compound. This reaction forms mixtures of the variously lithiated acetylenes, which are extremely difficult to separate. The lithiated acetylenes are not effective as polymerization initiators for conjugated dienes. Additionally, the acetylenic starting materials are chemical specialties which are very expensive, and not available in quantity.

Accordingly, a need exists for a process for preparing dilithio hydrocarbons without the various difficulties and drawbacks present in known processes.

SUMMARY OF THE INVENTION

It is an object of the instant invention to provide a method for preparing dilithio hydrocarbon compounds from readily available reactants, which compounds can serve as useful initiators for polymerization. It is another object of this invention to provide a method for dilithiating hydrocarbons in a simple, straightforward reaction, producing a satisfactory yield of the desired product with a minimum of difficulty.

These and other objects are accomplished by the instant invention which, stated simply, provides a method for producing dilithio hydrocarbons by heating a compound which is allyllithium or a hydrocarbon-substituted allyllithium which contains allylic hydrogen in the hydrocarbon substituents, the heating being performed at a temperature of from 50° to 150° C., preferably from 80° to 100° C., for a period of from 20 to 200 hours. Substituted allyllithium compounds which contain from four up to 100,000 or more carbon atoms can be used effectively. The hydrocarbon substituents can be straight chain or branched chain saturated aliphatic groups, or saturated cyclo-aliphatic groups or aryl groups. A minimum of olefinic unsaturation should be present in the substituents. Combinations of two or more of these types of substituents can be present.

The heating step acts to produce dilithio hydrocarbons, but also produces some lithium hydride and various non-lithiated hydrocarbons. These by-products need not be removed from the desired dilithio hydrocarbon product, as they are not harmful to polymerization reactions.

Among the lower molecular weight substituted allyllithium compounds which can be used as starting materials, the reaction products of secondary or tertiary butyllithium with isoprene or butadiene-1,3 are especially recommended.

By reacting, for example, equimolar amounts of sec-butyllithium with butadiene-1,3, the principal product formed is 1-lithio-5-methyl-2-heptene (both cis and trans isomers). Similarly, equimolar amounts of sec-butyllithium and isoprene react to produce primarily 1-lithio-3,5-dimethyl-2-heptenes. Since the reactants are readily available commercially, these starting compounds are quite useful in the method of the invention.

The dilithio compounds of the invention are particularly useful as initiators for producing block polymers having a central elastomeric block and terminal thermoplastic blocks. Typical of these polymers is an S-B-S triblock polymer, with the B representing a central block of butadiene homopolymer, with terminal blocks of styrene homopolymer represented by the S segments. In this case, the butadiene block is first formed, using a dilithio initiator. When the central block is formed, the polymer chains have two live ends, onto which the styrene homopolymer blocks are polymerized, by charging styrene monomer after all of the butadiene monomer has polymerized.

DESCRIPTION OF PREFERRED EMBODIMENTS

The starting compound in the method of the invention is described generally as allyllithium, or a hydrocarbon-substituted allyllithium which contains allylic hydrogen but little olefinic unsaturation in the hydrocarbon substituents. By reason of its structure, the compound has a lithium atom in the allylic position, that is, on a carbon atom which is adjacent to a carbon atom having a double bond attached thereto. Additionally, the compound contains replaceable allylic hydrogen. The compound can be the basic three-carbon compound allyllithium, or can contain hydrocarbon substituents up to as much as 100,000 or more carbon atoms, in the range of high polymers. The hydrocarbon substituents can be alkyl, aryl or cycloalkyl radicals, and should contain a minimum of olefinic unsaturation.

The substituted allyllithium compounds have the general formula:

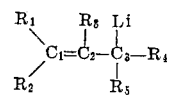

with the R's indicating possible substitution points. The carbon atoms are numbered for clarity. If either $R_4$ or $R_5$ is hydrogen, then the compound contains allylic hydrogen, and is within the scope of the invention as starting material. If $R_1$, $R_2$, or $R_3$ is a hydrocarbon radical, the carbon atom which attached to $C_1$ (in the case of $R_1$ and $R_2$) or to $C_2$ (in the case of $R_3$) is in the allylic position, and can carry allylic hydrogen. Of course, if $R_1$, $R_2$, or $R_3$ is a phenyl group or a tertiary carbon atom no allylic hydrogen will be present at these substituent points.

From the foregoing it can be seen that there are a very large number of substituted allyllithium compounds which will serve as starting compounds for the method of the invention. Most of the low-molecular weight compounds produce dilithio initiators which are relatively insoluble in the hydrocarbon solvents normally used for polymerizing conjugated dienes and/or styrene. Where greater solubility is desired, those compounds having larger hydrocarbon substituent groups yield dilithio initiators which tend toward increased solubility in hydrocarbon solvents. Similarly, aryl substituents can affect the behavior of the dilithio initiators in contact with styrene and such diluents as benzene or toluene.

Particularly recommended as starting compounds are the reaction products of conjugated dienes having four to 10 carbon atoms with secondary or tertiary monolithio alkane compounds of from three to 20 carbon atoms.

The lithio alkanes which can be employed include, for example:
1-methyl-1-lithioethane
1-methyl-1-lithiopropane
1,1-dimethyl-1-lithioethane
2-lithiopentane
3-lithiopentane
2-methyl-2-lithiobutane
2-methyl-3-lithiobutane
2-methyl-4-lithiopentane
3-methyl-3-lithiopentane
2-methyl-3,3-dimethyl-2-lithiobutane
3,3-diethyl-2-lithiopentane
2-lithioundecane and the like.

Preferred are
1-methyl-1-lithioethane
1-methyl-1-lithiopropane, and
1,1-dimethyl-1-lithioethane Conjugated dienes which can be used in the first step include:
1,3-butadiene
isoprene
2,3-dimethyl-1,3-butadiene
1,3-pentadiene (piperylene)
3-methyl-1,3-pentadiene
1,3-heptadiene
3,4-dimethyl-1,3-hexadiene and the like.

Preferred conjugated dienes are
1,3-butadiene
isoprene
piperylene

The reaction can be performed at a relatively low temperature, from −30° to 0° C., and this reaction will proceed to completion in 20 to 100 hours, forming a hydrocarbon-substituted allyllithium compound. Temperatures above 0° C. tend to promote the formation of oligomers, with 2 or more molecules of the conjugated diene reacting with 1 molecule of the monolithio alkane. Generally, equimolar amounts of the two reactants are employed, although a slight excess of conjugated diene is not particularly harmful. An excess of monolithio alkane should be avoided, since the presence of monolithio hydrocarbons in the reaction product is undesirable.

The substituted allyllithium compound produced in the first step is then heated at a temperature of from 50° to 150° C., preferably from 80° to 100° C. for a period of from 20 to 200 hours. The heating step appears to cause the compound to undergo a self-metalation reaction, forming a substantial proportion of dilithio hydrocarbon. During the heating step a loss of carbon-bound lithium is observed, as measured by the modified Gilman titration described by Turner et al. in Rubber Chemistry and Technology, 42, 1054 (1969). It is hypothesized that this loss is due to formation of lithium hydride, as evidenced by the production of hydrogen on hydrolysis. AFter prolonged heating the amount of carbon-bound lithium remaining can approach 50 percent.

Both the first step and the subsequent heating step can be performed in the presence of an inert diluent, such as lower aliphatic hydrocarbons, to improve heat-transfer and assist in product separation. Hexanes, heptanes and the like are preferred.

If the dilithio products formed are insoluble in the mixture produced (which can include inert diluents), they can be separated by filtration if desired. However, separation is not generally necessary, since the by-products of the reaction are not generally harmful to subsequent use of the dilithio product.

Other dilithio hydrocarbons can be similarly prepared by heat-treating any of the substituted allyllithium compounds as defined generally above.

Additional substituted allyllithium compounds which can be used include:
1-lithio-3,3-dimethyl-2-hexene
1-lithio-3,3-diphenyl-2-propene
2-lithio-5-methyl-3-pentene
2-lithio-2,5-dimethyl-3-hexene
2-lithio-2-methyl-3-heptene
1-lithio-2-methyl-2-propene
1-lithio-2-vinylpentane A better understanding of the method of the invention can be obtained by reference to the following examples, in which all percentages are by weight, unless otherwise indicated. The examples are included for illustrative purposes, and are not to be construed as limiting the scope of the invention, which is defined by the appended claims.

EXAMPLE I

Equimolar amounts of sec-butyllithium and 1,3-butadiene were combined and sealed in a series of nitrogen-filled tubes. The tubes were agitated at −25° C. The reaction progress was followed by periodically quenching the contents of an individual tube in water at 0° C., and analyzing the hydrocarbons by gas chromatography. At 24–36 hours, no more butane was found in the chromatograph of the hydrolysate, indicating that essentially all the sec-butyllithium had reacted.

At this point, the composition of the contents of the tubes after hydrolysis was shown in Table I, following.

TABLE I

| Material | Weight % |
|---|---|
| trans-5-methyl-2-heptene | 62.5 |
| cis-5-methyl-2-heptene | 19.4 |
| 5-methyl-1-heptene | 6.2 |
| C-12 and C-16 hydrocarbons | 12.0 |
| Total | 100.1 |

The first three compounds listed in Table I were all identified as monoolefinic C-8 hydrocarbons. The amount of the first two compounds was determined by gas chromatographic techniques, and the structure assignments were made by infra-red and NMR spectrometry. The third C-8 isomer amount was obtained by difference.

It was seen that the bulk of the product was in the form of C–8 monoolefins, suggesting it to be the product of the addition of equimolar quantities of the two reactants. The C–12 and C–16 products, similarly, appear to be the result of the addition of two and three butadiene units respectively to sec-butyllithium.

EXAMPLE II

In order to study the behavior on heating of the reaction products produced in Example I, sealed tubes were prepared as before, charged with equimolar amounts of sec-butyllithium and 1,3-butadiene. After 30 hours at −25° C., the tubes were warmed to room temperature, and then placed in a bath at 80° to 100° C. It was noticed that a white solid precipitated on warming to room temperature.

On further heating in the bath, a greatly increased amount of solid was observed, and the solution assumed a dark, red-brown color.

The progress of the heating reaction was followed by periodic titrations for carbon-bound lithium, using the modified Gilman titration method of Turner et al. in Rubber Chem. & Tech. 42, 1054 (1969). At 80° C. the level of carbon-bound lithium dropped to about 70 percent after 60 hours, and to about 60 percent after 120 hours, based on the original content. At 100° C. the level was about 60 percent after 20 hours, and down to about 40 percent after 140 hours. At both temperatures the percentage of remaining carbon-bound lithium appeared to level off after an initial rapid drop.

The products of the heating reaction were hydrolyzed as before, using $D_2O$ as well as $H_2O$. Analysis of a sample after the step of warming to room temperature, but before heat-treatment, showed no apparent chemical change during the warming step.

Reactants which had been heat-treated to reduce their carbon-bound lithium to 50 percent of its original value were then studied. The solid, insoluble portion was first separated from the liquid by filtration. Each of these phases was then hydrolyzed, a portion with $H_2O$, and another portion with $D_2O$. The resultant hydrocarbons were analyzed by mass spectroscopy.

Mass spectroscopy of the solid portion which had been hydrolyzed with $H_2O$ showed C–8 hydrocarbons with molecular weights of 112. The solid portion which was hydrolyzed with $D_2O$ showed C–8 hydrocarbons with molecular weights of 114. From these figures, the solid portion was concluded to be dilithiated C–8 compounds.

Similar mass spectroscopy investigation of the filtrate yielded C–8 hydrocarbons of 112 molecular weight when treated with either $H_2O$ or $D_2O$, indicating that the filtrate consisted of non-lithiated C–8 products.

In a similar manner, the C–12 portion of the product was shown to be dilithiated. Analysis of the C–16 portion was made considerably more difficult by the complexity of the mixture of isomers.

In the preceding examples the monolithio hydrocarbons of the compounds produced are shown to be the product of the reaction of substantially equimolar amounts of a monolithio alkyl hydrocarbon and a conjugated diene. Both the reactants were four-carbon compounds, and the product consisted principally of monolithiated C–8 hydrocarbons, indicating a one-to-one molar addition of the reactants predominated. However, the presence of C–12 and C–16 compounds in the product showed that two or more molecules of the conjugated diene can add to the monolithio alkyl, and produce a series of monolithio hydrocarbons.

On subsequent heating, a mixture of C–8, C–12, and C–16 dilithio hydrocarbons is formed which are all effective initiators of polymerization. While additional olefinic unsaturation is present in the C–12 and C–16 dilithio hydrocarbons as a result of the addition of two and three molecules of butadiene, respectively, no appreciable amount of polylithiated compounds is found. Hence, the higher molecular weight products which can be produced in the method of the invention are also useful, as well as those compounds which are one-to-one addition products. If desired, however, these higher molecular weight products can be separated out by any convenient means.

I claim:

1. The method of producing dilithio hydrocarbons by heating allyllithium or a hydrocarbon-substituted allyllithium which contains allylic hydrogen in the hydrocarbon substituents at a temperature of from 50° to 150° C. for 20 to 200 hours, wherein the hydrocarbon-substituted allyllithium is the product of the reaction of a secondary or tertiary monolithio alkane of from three to 20 carbon atoms with a conjugated diene of from 4 to 10 carbon atoms, said reaction being performed at from −30° to 0° C. for a period of from 20 to 100 hours.

2. The method of claim 1, wherein the monolithio alkane is sec-butyllithium or tert-butyllithium.

3. The method of claim 1, wherein the conjugated diene is isoprene or butadiene-1,3.

4. The method of claim 1, wherein an inert hydrocarbon diluent is present.

5. The method of claim 1, wherein the heating is performed at from 80° to 100° C.

* * * * *